(12) United States Patent
Wu et al.

(10) Patent No.: US 11,275,960 B2
(45) Date of Patent: Mar. 15, 2022

(54) MULTI-SENSOR-BASED UNDER-SCREEN FINGERPRINT CAPTURING METHOD AND SYSTEM AND ELECTRONIC DEVICE

(71) Applicant: SHENZHEN GOODIX TECHNOLOGY CO., LTD., Shenzhen (CN)

(72) Inventors: Dan Wu, Shenzhen (CN); Rongying Hu, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 84 days.

(21) Appl. No.: 16/833,494

(22) Filed: Mar. 27, 2020

(65) Prior Publication Data
US 2020/0226404 A1 Jul. 16, 2020

Related U.S. Application Data

(63) Continuation of application No. PCT/CN2018/107382, filed on Sep. 25, 2018.

(51) Int. Cl.
*G06K 9/20* (2006.01)
*G06K 9/00* (2006.01)

(52) U.S. Cl.
CPC ......... *G06K 9/209* (2013.01); *G06K 9/00013* (2013.01)

(58) Field of Classification Search
CPC ...... G06K 9/209; G06K 9/00013; G06K 9/22; G06K 9/0004; G06F 3/0412; G06F 21/32
See application file for complete search history.

(56) References Cited

U.S. PATENT DOCUMENTS

| | | | |
|---|---|---|---|
| 2017/0053149 A1* | 2/2017 | Jiang | ............. G06F 3/04847 |
| 2019/0019048 A1* | 1/2019 | Deng | ............. G06F 21/32 |
| 2020/0160022 A1 | 5/2020 | Li | |

FOREIGN PATENT DOCUMENTS

| | | |
|---|---|---|
| CN | 104951159 A | 9/2015 |
| CN | 106991387 A | 7/2017 |
| CN | 107113349 A | 8/2017 |
| CN | 107194224 A | 9/2017 |
| CN | 107450712 A | 12/2017 |
| CN | 108200228 A | 6/2018 |
| CN | 108235750 A | 6/2018 |
| CN | 108323195 A | 7/2018 |
| CN | 108563980 A | 9/2018 |

\* cited by examiner

*Primary Examiner* — Abhishek Sarma (57) ABSTRACT

Provided are a multi-sensor-based under-screen fingerprint capturing method and system and an electronic device, applied to an under-screen fingerprint capturing system including multiple fingerprint sensors, where the method includes: determining an effectively pressed fingerprint sensor among the multiple fingerprint sensors according to a pressing region of a user on a display screen, where each fingerprint sensor corresponds to a sensing region, and sensing regions corresponding to the multiple fingerprint sensors form a fingerprint capturing region of the under-screen fingerprint capturing system; controlling the effectively pressed fingerprint sensor to be in a working state and another fingerprint sensor other than the effectively pressed fingerprint sensor to be in a non-working state; and capturing fingerprint information of the user via the effectively pressed fingerprint sensor.

18 Claims, 4 Drawing Sheets

| Determining an effectively pressed fingerprint sensor among the multiple fingerprint sensors according to a pressing region of a user on a display screen, where each fingerprint sensor corresponds to a sensing region, and sensing regions corresponding to the multiple fingerprint sensors form a fingerprint capturing region of the under-screen fingerprint capturing system | S210 |

↓

| Controlling the effectively pressed fingerprint sensor to be in a working state and another fingerprint sensor other than the effectively pressed fingerprint sensor to be in a non-working state | S220 |

↓

| Capturing fingerprint information of the user via the effectively pressed fingerprint sensor | S230 |

MULTI-SENSOR-BASED UNDER-SCREEN FINGERPRINT CAPTURING METHOD AND SYSTEM AND ELECTRONIC DEVICE

This application is a continuation of International Application No. PCT/CN2018/107382, filed on Sep. 25, 2018, the disclosure of which is hereby incorporated by reference in its entirety.

TECHNICAL FIELD

The present application relates to the technical field of fingerprints, and more particularly to a multi-sensor-based under-screen fingerprint capturing method and system and an electronic device.

BACKGROUND

An under-screen fingerprint identification apparatus can be built into a display screen of a mobile phone without constraint by a specific size, and can realize a large area of fingerprint identification, which is equivalent to increasing a length of a password and improving security of fingerprint identification. However, the large area of fingerprint identification requires longer fingerprint matching time, resulting in larger power consumption of a terminal and affecting user experience.

SUMMARY

Embodiments of the present application provide a multi-sensor-based under-screen fingerprint capturing method and system and an electronic device, which is capable of reducing power consumption of a terminal.

In a first aspect, provided is a multi-sensor-based under-screen fingerprint capturing method, applied to an under-screen fingerprint capturing system including multiple fingerprint sensors, where the method includes:

determining an effectively pressed fingerprint sensor among the multiple fingerprint sensors according to a pressing region of a user on a display screen, where each fingerprint sensor corresponds to a sensing region, and sensing regions corresponding to the multiple fingerprint sensors form a fingerprint capturing region of the under-screen fingerprint capturing system;

controlling the effectively pressed fingerprint sensor to be in a working state and another fingerprint sensor other than the effectively pressed fingerprint sensor to be in a non-working state; and capturing fingerprint information of the user via the effectively pressed fingerprint sensor.

In a possible implementation manner, the determining the effectively pressed fingerprint sensor among the multiple fingerprint sensors according to the pressing region of the user on the display screen includes:

determining an overlapping region between the pressing region and a sensing region of each fingerprint sensor of the multiple fingerprint sensors; and determining the effectively pressed fingerprint sensor among the multiple fingerprint sensors according to an area of the overlapping region between the pressing region and the sensing region of the each fingerprint sensor.

In a possible implementation manner, the determining the effectively pressed fingerprint sensor among the multiple fingerprint sensors according to the area of the overlapping region between the pressing region and the sensing region of the each fingerprint sensor includes:

determining a fingerprint sensor corresponding to an overlapping region having an area larger than a first threshold as the effectively pressed fingerprint sensor.

In a possible implementation manner, the method further includes:

determining a number threshold of the effectively pressed fingerprint sensor according to a security level of a first operation of triggering fingerprint capturing and a first correspondence relationship, where the first correspondence relationship is a correspondence relationship between a security level and a number threshold of the effectively pressed fingerprint sensor.

In a possible implementation manner, the determining the effectively pressed fingerprint sensor among the multiple fingerprint sensors according to the area of the overlapping region between the pressing region and the sensing region of the each fingerprint sensor includes:

determining the effectively pressed fingerprint sensor among the multiple fingerprint sensors according to the area of the overlapping region between the pressing region and the sensing region of the each fingerprint sensor in combination with the number threshold of the effectively pressed fingerprint sensor.

In a possible implementation manner, the determining the effectively pressed fingerprint sensor among the multiple fingerprint sensors according to the area of the overlapping region between the pressing region and the sensing region of the each fingerprint sensor in combination with the number threshold of the effectively pressed fingerprint sensor includes:

determining K largest overlapping region(s) from the overlapping region between the pressing region and the sensing region of the each fingerprint sensor, where K is a number threshold of the effectively pressed fingerprint sensor corresponding to the security level of the first operation;

determining a target overlapping region having an area larger than a second threshold among the K overlapping region(s); and determining a fingerprint sensor corresponding to the target overlapping region as the effectively pressed fingerprint sensor.

In a possible implementation manner, in the first correspondence relationship, a first security level corresponds to N fingerprint sensors, a second security level corresponds to M fingerprint sensor(s), and the first security level is higher than the second security level, where N and M are positive integers, and N is greater than M.

In a possible implementation manner, M is a number of fingerprint sensors against which a single finger is able to be pressed, and N is a number of fingerprint sensors against which at least two fingers are able to be pressed.

In a possible implementation manner, the method further includes:

controlling a region corresponding to the effectively pressed fingerprint sensor on the display screen to be illuminated.

In a possible implementation manner, the method further includes:

performing fingerprint identification according to the fingerprint information of the user captured by the effectively pressed fingerprint sensor.

In a possible implementation manner, that the another fingerprint sensor is in the non-working state represents that the another fingerprint sensor is in a sleep state or a power-off state.

In a second aspect, provided is a multi-sensor-based under-screen fingerprint capturing system, including:

multiple fingerprint sensors configured to capture fingerprint information of a user, where each fingerprint sensor corresponds to a sensing region, and sensing regions corresponding to the multiple fingerprint sensors form a fingerprint capturing region of the under-screen fingerprint capturing system; and a processing unit configured to determine an effectively pressed fingerprint sensor among the multiple fingerprint sensors according to a pressing region of a user on a display screen, control the effectively pressed fingerprint sensor to be in a working state and another fingerprint sensor other than the effectively pressed fingerprint sensor to be in a non-working state, and capture the fingerprint information of the user via the effectively pressed fingerprint sensor.

Optionally, the processing unit is further configured to: determine an overlapping region between the pressing region and a sensing region of each fingerprint sensor of the multiple fingerprint sensors; and determine the effectively pressed fingerprint sensor among the multiple fingerprint sensors according to an area of the overlapping region between the pressing region and the sensing region of the each fingerprint sensor.

Optionally, the processing unit is configured to: determine a fingerprint sensor corresponding to an overlapping region having an area larger than a first threshold as the effectively pressed fingerprint sensor.

Optionally, the processing unit is further configured to: determine a number threshold of the effectively pressed fingerprint sensor according to a security level of a first operation of triggering fingerprint capturing and a first correspondence relationship, where the first correspondence relationship is a correspondence relationship between a security level and a number threshold of the effectively pressed fingerprint sensor.

Optionally, the processing unit is further configured to: determine the effectively pressed fingerprint sensor among the multiple fingerprint sensors according to the area of the overlapping region between the pressing region and the sensing region of the each fingerprint sensor in combination with the number threshold of the effectively pressed fingerprint sensor.

Optionally, the processing unit is configured to: determine K largest overlapping region(s) from the overlapping region between the pressing region and the sensing region of the each fingerprint sensor, where K is a number threshold of the effectively pressed fingerprint sensor corresponding to the security level of the first operation;

determine a target overlapping region having an area larger than a second threshold among the K overlapping region(s); and determine a fingerprint sensor corresponding to the target overlapping region as the effectively pressed fingerprint sensor.

Optionally, in the first correspondence relationship, a first security level corresponds to N fingerprint sensors, a second security level corresponds to M fingerprint sensor(s), and the first security level is higher than the second security level, where N and M are positive integers, and N is greater than M.

Optionally, M is a number of fingerprint sensors against which a single finger is able to be pressed, and N is a number of fingerprint sensors against which at least two fingers are able to be pressed.

Optionally, the processing unit is further configured to: control a sensing region of the effectively pressed fingerprint sensor on the display screen to be illuminated.

Optionally, the processing unit is further configured to: perform fingerprint identification according to the fingerprint information of the user captured by the effectively pressed fingerprint sensor.

Optionally, the processing unit is disposed in a fingerprint module or an electronic device, where the fingerprint module includes the multiple fingerprint sensors.

Optionally, the processing unit is a micro control unit (MCU) in a fingerprint module or a processor in an electronic device.

Optionally, the processing unit includes:

a touch control module configured to determine the effectively pressed fingerprint sensor among the multiple fingerprint sensors according to the pressing region of the user on the display screen; and a fingerprint control module configured to control on and off of the multiple fingerprint sensors.

Optionally, the processing unit further includes:

a fingerprint identification module configured to perform fingerprint identification according to the fingerprint information of the user captured by the effectively pressed fingerprint sensor.

Optionally, the touch control module is disposed in an electronic device, the fingerprint control module is disposed in an electronic device or a fingerprint module, and the fingerprint identification module is disposed in an electronic device or a fingerprint module.

In a third aspect, provided is a chip, including an input and output interface, at least one processor, at least one memory and a bus, where the at least one memory is configured to store an instruction, and the at least one processor is configured to call the instruction in the at least one memory, to execute the method in the first aspect or any possible implementation manner of the first aspect.

In a fourth aspect, provided is an electronic device including the under-screen fingerprint capturing system according to the second aspect or any possible implementation manner of the second aspect.

In a fifth aspect, provided is an electronic device including the chip as in the third aspect.

In a sixth aspect, provided is a computer readable medium, configured to store a computer program, where the computer program includes instructions used to execute the method in the first aspect or any possible implementation manner of the first aspect.

In a seventh aspect, provided is a computer program product including instructions that when a computer runs the instructions of the computer program product, the computer executes the under-screen fingerprint capturing method in the forgoing first aspect or any possible implementation manner of the first aspect.

Specifically, the computer program product may be run on the electronic device of the foregoing fourth aspect.

Therefore, according to a fingerprint capturing solution in an embodiment of the present application, an effectively pressed fingerprint sensor may be determined among multiple fingerprint sensors according to a pressing region of a user on a display screen, and then only the effectively pressed fingerprint sensor is controlled to be turned on, so that fingerprint capturing is performed only by the effectively pressed fingerprint sensor, which is beneficial to reducing power consumption of a terminal. Further, during fingerprint identification, fingerprint matching is only required for fingerprint information captured by the effectively pressed fingerprint sensor, instead of fingerprint information captured by all fingerprint sensors, which is beneficial to reducing matching time and improving user experience.

DESCRIPTION OF EMBODIMENTS

Technical solutions of the present application are described below in combination with accompanying drawings.

It should be understood that embodiments of the present application may be applied to a fingerprint system, including but not limited to an optical, ultrasonic or other fingerprint identification system and a medical diagnostic product based on optical, ultrasonic or other fingerprint imaging. The embodiments of the present application are only described by an example of an optical fingerprint system, which should not constitute any limitation to the embodiments of the present application, and the embodiments of the present application are also applicable to other systems using an optical, ultrasonic or other imaging technology or the like.

It should also be understood that, in addition to fingerprint identification, the technical solutions of the present application can perform other biometric identification, such as palmprint identification, iris identification, face identification or the like, which is not limited in the embodiments of the present application.

As an electronic device enters an era of full screen, a fingerprint capturing region on the front of the electronic device is squeezed by the full screen, and therefore, under-display or under-screen fingerprint identification technology has gained an increasing attention. The under-screen fingerprint identification technology refers to mounting a fingerprint identification module under a display screen, so as to realize a fingerprint identification operation in a display region of the display screen without setting a fingerprint capturing region in a region other than the display region on the front of an electronic device.

Optical under-screen fingerprint identification technology uses light returned from a top surface of a display component of a device for fingerprint sensing and other sensing operations. The returned light carries information of an object (e.g., a finger) in contact with the top surface, and by capturing and detecting the returned light, a particular optical sensor module under a display screen is implemented. The optical sensor module may be designed to achieve desired optical imaging by properly configuring optical elements for capturing and detecting the returned light.

It should be understood that technical solutions of embodiments of the present application can be applied to various electronic devices, for example, portable or mobile computing devices such as smart phones, notebook computers, tablet computers and game devices, and other electronic devices such as electronic databases, automobiles and automated teller machines (ATM), which is not limited in the embodiments of the present application.

Figure 1A:
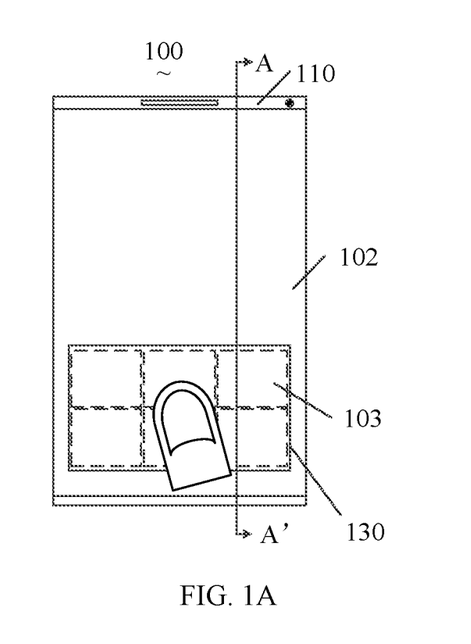
FIG. 1A is an oriented diagram of an electronic device according to an embodiment of the present application.
Figure 1B:
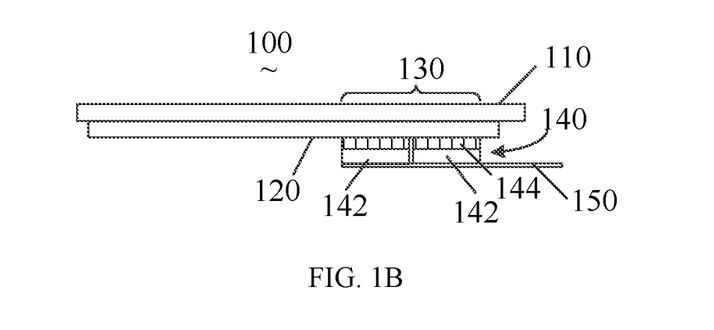
FIG. 1B is a partial schematic cross-sectional structural diagram of the electronic device shown in FIG. 1A taken along A-A'.

FIG. 1 is a schematic diagram of an electronic device 100 to which a fingerprint identification apparatus is applicable. FIG. 1A is a schematic front diagram of an electronic device 100, and FIG. 1B is a partial schematic cross-sectional structural diagram of the electronic device 100 shown in FIG. 1A taken along A-A'.

As shown in FIG. 1, the electronic device 100 may include a display screen 120 and a fingerprint identification module 140; and the display screen 120 has a display region 102, and the fingerprint identification module 140 is disposed under the display screen 120.

The display screen 120 may be a self-emitting display screen that employs a self-emitting display unit as a display pixel. For example, the display screen 120 may be an organic light-emitting diode (OLED) display screen or a micro light-emitting diode (Micro-LED) display screen. In other alternative embodiments, the display screen 120 may also be a liquid crystal display (LCD) screen or other passive light-emitting display screens, which is not limited in the embodiments of the present application.

On the other hand, the display screen 120 may be a touch display screen for example, which may not only perform image display, but also detect a touch or press operation of a user, thereby providing the user with a human-machine interaction interface. For example, in an embodiment, the electronic device 100 may include a touch sensor, and the touch sensor may be specifically a touch panel (TP), which may be disposed on a surface of the display screen 120, or may be partially or wholly integrated into the display screen 120 to form the touch display screen.

The fingerprint identification module 140 may be specifically an optical fingerprint identification module, and is mainly used for capturing fingerprint information (such as fingerprint image information) of a user. In an embodiment of the present application, the fingerprint identification module 140 may be disposed at least in a partial area under the display screen 120 such that a fingerprint capturing area (or sensing area) 130 of the fingerprint identification module 140 is at least partially located in the display region 102 of the display screen 120. Here, an area of the fingerprint capturing region 130 may be different from that of the fingerprint identification module 140, for example, the area of the fingerprint capturing region 130 of the fingerprint identification module 140 may be allowed to be larger than that of the fingerprint identification module 140 by an optical path design such as lens imaging, reflective folding, or other light convergence or reflection. In other alternative implementation manners, if an optical path is directed by a light collimation method for example, the area of the fingerprint capturing region 130 of the fingerprint identification module 140 may also be designed to be identical with that of the fingerprint identification module 140.

As an embodiment, the fingerprint identification module 140 may specifically include multiple optical fingerprint sensors 142 (hereinafter also referred to as sensor chips) having optical sensing arrays; and the multiple optical fingerprint sensors 142 may be disposed side by side under the display screen 120. Each of the optical fingerprint sensors 142 includes multiple optical sensing units, respectively, and regions located by the optical sensing arrays correspond to sensing regions 103 of the optical fingerprint sensors in which the optical sensing arrays are located. The sensing regions of the multiple optical fingerprint sensors together constitute the fingerprint capturing region 130 of the fingerprint identification module 140. That is, the fingerprint capturing region 130 of the fingerprint identification module 140 may include multiple sub-regions, each of which corresponds to the sensing region of one of the optical fingerprint sensors or the optical sensing arrays, respectively. As shown in FIG. 1A, the fingerprint capturing region 130 is located in the display region 102 of the display screen 120. Since the multiple optical fingerprint sensors are adopted to be disposed in the side by side manner, the fingerprint capturing region 130 of the fingerprint identification module 140 may be extended to a main region in the lower half part of the display region 102, that is, to a customary pressing region of a finger, thereby implementing a blind-press type fingerprint input operation. In other alternative embodiments, when the number of the optical fingerprint sensors is sufficient, the fingerprint capturing region 130 may be further extended to half or even the whole display region, thereby implementing half screen or full screen fingerprint detection. Therefore, when a user needs to unlock the electronic device 100 or perform other fingerprint verification, a fingerprint input operation can be implemented merely by pressing a finger on the fingerprint capturing region 130 in the display screen 120. Since fingerprint capturing and detection can be implemented inside the display region 102 of the display screen 120, a front face of the electronic device 100 in the above structure does not need to specially reserve space to set a fingerprint button (such as a Home button), so that it is possible that a full screen solution can be adopted. Therefore, the display region 102 of the display screen 120 could be substantially extended to the whole front face of the electronic device 100.

In a specific embodiment, the multiple optical fingerprint sensors 142 of the fingerprint identification module 140 may be independently encapsulated sensor chips, or may be manufactured into multiple dies and encapsulated in the same chip encapsulant, or may further be manufactured in different regions of the same die by a semiconductor process. On the other hand, the optical fingerprint sensors 142 may also include a readout circuit and/or other auxiliary circuits electrically connected to the sensing arrays in addition to the optical sensing arrays as described above. As an optional implementation manner, as shown in FIG. 1B, an optical path modulator 144 may further be disposed above the optical fingerprint sensor 142. As an example, the optical path modulator 144 may be attached on the sensing arrays of the optical fingerprint sensors 142 as an independent optical component, or integrated into the chip of the optical fingerprint sensors 142 by a semiconductor process, thereby implementing the ultra-thin fingerprint identification module 140. Specifically, the optical path modulator 144 may be an optical collimator having an array of through holes with a high aspect ratio, and is mainly used for collimating, modulating, and imaging downwardly propagating fingerprint detection light, so that reflected light from a finger surface is directed to the sensing arrays for optical detection to acquire fingerprint image information.

Optionally, corresponding to the multiple optical fingerprint sensors 142 of the fingerprint identification module 140, the optical path modulator 144 may be plural, and each optical path modulator 144 corresponds to an optical fingerprint sensor respectively, and is respectively attached on the corresponding optical fingerprint sensor 142. Alternatively, the multiple optical fingerprint sensors 142 may also share one entire optical path modulator 144, that is, the optical path modulator 144 has an area large enough to cover the sensing arrays of the multiple optical fingerprint sensors 142. In addition, other optical components, for example, a filter or other optical films, may be further disposed between the optical path modulator 144 and the optical fingerprint sensor 142 or between the display screen 120 and the optical path modulator 144, and are mainly used to isolate the impact of external interference light on optical fingerprint detection. The filter may be used to filter out ambient light that penetrates a finger and enters into the optical fingerprint sensors 142 via the display screen 120. Similar to the optical path modulator 144, the filter may be respectively disposed on each of the optical fingerprint sensors 142 to filter out interference light, or a filter in a large area may also be used to cover the multiple optical fingerprint sensors 142 simultaneously.

Alternatively, the optical path modulator 144 may also be replaced by an optical lens, and pinholes may be formed by a light-shielding material above the optical lens to cooperate with the optical lens to converge fingerprint detection light to the optical fingerprint sensors 142 under the optical lens, thereby achieving fingerprint imaging. Similarly, each of the optical fingerprint sensors 142 may be respectively configured with an optical lens for fingerprint imaging, or the multiple optical fingerprint sensors 142 may also utilize the same optical lens to achieve light convergence and fingerprint imaging. In other alternative embodiments, each of the optical fingerprint sensors 142 may even further have dual sensing arrays (Dual-Array) or multiple sensing arrays (Multi-Array), and two or more optical lenses are configured to cooperate with the dual or multiple sensing arrays for optical imaging so as to reduce imaging distance and enhance imaging effect.

In an embodiment of the present application, the display screen 120 adopting an OLED display screen is taken as an example, a light-emitting layer of the display screen 120 has OLED display unit arrays distributed in an array, and the fingerprint identification module 140 may utilize an OLED display unit (i.e., an OLED light source) of the OLED display screen 120 that is located in the fingerprint capturing region 130 as an excitation light source for fingerprint detection and identification. Of course, it should be understood that in other alternative implementations, the fingerprint identification module 140 may also provide an optical signal for fingerprint detection and identification by adopting a built-in light source or an external light source. In this case, an under-screen fingerprint identification apparatus can be not only applied to a self-emitting display screen such as an OLED display screen, but also applied to a non-self-emitting display screen such as a liquid crystal display screen or other passive light-emitting display screens. For example, in the case of application to a liquid crystal display screen having a backlight module and a liquid crystal panel, in order to support under-screen fingerprint detection of the liquid crystal display screen, the under-screen fingerprint identification apparatus may further include an excitation light source for optical fingerprint detection, and the excitation light source may be specifically an infrared light source or a light source at a specific invisible light wavelength. As an example, the infrared light source may be disposed under the backlight module of the liquid crystal display screen or disposed in an edge region under a protective cover of the electronic device 100, while the fingerprint identification module 140 is disposed under the backlight module, and the backlight module forms through holes or performs other optical designs on film layers such as diffusers, brightness enhancement sheets and reflectors to allow fingerprint detection light to pass through the liquid crystal panel and the backlight module and reach the optical fingerprint sensors of the fingerprint identification module 140.

Moreover, the optical sensing arrays of the fingerprint identification module 140 may be specifically a photo detector array (or referred to as a photodetector array) that includes multiple photo detectors distributed in an array, and the photo detectors may serve as the optical sensing units as described above. A micro lens may be further formed above the photo detectors to improve an imaging effect of a fingerprint image.

When a finger touches, is pressed against, or approaches (collectively referred to as pressing for convenience of description) the fingerprint capturing region 130, light emitted by the display unit of the fingerprint capturing region 130 or an additionally provided excitation source for fingerprint detection is reflected by the finger to form reflected light that may carry fingerprint information of the finger of a user. For example, after the light is reflected by a fingerprint on the surface of the user's finger, the reflected light carries fingerprint information of the user, because the reflected light of a finger fingerprint ridge is different from that of a finger fingerprint valley. The reflected light is returned to the display screen 120, received by the photo detector array of the fingerprint identification module 140 under the display screen 120, and converted into a corresponding electrical signal, i.e., a fingerprint detection signal. The electronic device 100 can acquire fingerprint information of the user based on the fingerprint detection signal, and can further perform fingerprint matching verification, thereby completing identity verification of the current user so as to confirm whether the user has permission to perform a corresponding operation on the electronic device 100.

It should be understood that in a specific implementation, the electronic device 100 further includes a protective cover 110, the protective cover 110 may be specifically a transparent cover such as a glass cover or a sapphire cover which is located on the display screen 120 and covers a front face of the electronic device 100, and the surface of the protective cover 110 may also be provided with a protective layer. Therefore, in an embodiment of the present application, the so-called finger being pressed against the display screen 120 may actually refer to the finger being pressed against the cover 110 on the display screen 120 or covering a surface of the protective layer of the cover 110.

On the other hand, a circuit board 150, for example, a flexible printed circuit (FPC), may be further provided under the fingerprint identification module 140. The fingerprint identification module 140 can be soldered to the circuit board 150 through a pad, and achieve electrical interconnection and signal transmission with other peripheral circuits or other elements of the electronic device 100 through the circuit board 150. For example, the fingerprint identification module 140 may receive a control signal of a processing unit of the electronic device 100 through the circuit board 150, and may also output the fingerprint detection signal to the processing unit, a control unit or the like of the electronic device 100 through the circuit board 150.

Figure 2:
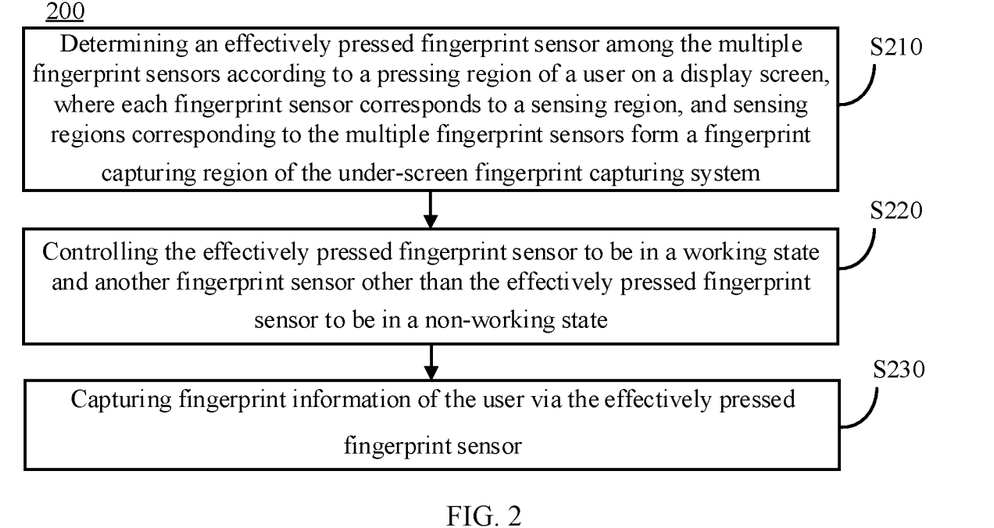
FIG. 2 is a schematic flowchart of a multi-sensor-based under-screen fingerprint capturing method according to an embodiment of the present application.

FIG. 2 is a schematic flowchart of a multi-sensor-based under-screen fingerprint capturing method 200 according to an embodiment of the present application. The method 200 may be applied to a multi-sensor-based under-screen fingerprint capturing system. As shown in FIG. 2, the method 200 includes:

S210, determining an effectively pressed fingerprint sensor among the multiple fingerprint sensors according to a pressing region of a user on a display screen, where each fingerprint sensor corresponds to a sensing region, and sensing regions corresponding to the multiple fingerprint sensors form a fingerprint capturing region of the under-screen fingerprint capturing system;

S220, controlling the effectively pressed fingerprint sensor to be in a working state and another fingerprint sensor other than the effectively pressed fingerprint sensor to be in a non-working state; and S230, capturing, by the effectively pressed fingerprint sensor, fingerprint information of the user.

It should be understood that the fingerprint sensors in the embodiment of the present application may correspond to the light detecting portion 142 in FIG. 1. Each fingerprint sensor corresponds to a sensing region, the sensing region of the each fingerprint sensor may be understood as a region of the each fingerprint sensor for fingerprint detection (or fingerprint capturing), and the sensing region of the each fingerprint sensor of the multiple fingerprint sensors is combined to form a fingerprint detection region of the fingerprint capturing system, which can be used to achieve a large area of fingerprint capturing, for example, fingerprint capturing of multiple fingers.

Optionally, in the embodiment of the present application, the multiple fingerprint sensors may be disposed in a fingerprint module, and the fingerprint module may correspond to the optical fingerprint apparatus 140 in FIG. 1 and may be disposed under the display screen.

Optionally, in some embodiments, the under-screen fingerprint capturing system may be disposed in a fingerprint module, or the fingerprint capturing system may be the fingerprint module, or the fingerprint capturing system may include the fingerprint module.

Optionally, in other embodiments, the under-screen fingerprint capturing system may also be disposed in an electronic device, or the fingerprint capturing system may also be the electronic device.

Optionally, in the embodiment of the present application, the method 200 may be performed by a processing unit in the under-screen fingerprint capturing system. Specifically, a function performed by the processing unit may be performed by a micro control unit (MCU) of a fingerprint module, or performed by a processor of an electronic device, or commonly performed by the MCU of the fingerprint module and the processor of the electronic device.

In the following, a fingerprint capturing method in an embodiment of the present application is described with a fingerprint capturing system as an executive body.

In the embodiment of the present application, the fingerprint capturing system may determine an effectively pressed fingerprint sensor among the multiple fingerprint sensors according to a pressing region of a user on the display screen, and may further control the effectively pressed fingerprint sensor to be in a working state and another fingerprint sensor other than the effectively pressed fingerprint sensor to be in a non-working state, that is, only the effectively pressed fingerprint sensor is turned on, so that fingerprint information of the user may be captured only by the effectively pressed fingerprint sensor, which is beneficial to reducing power consumption of a terminal.

Optionally, in the embodiment of the present application, if the number of the effectively pressed fingerprint sensors is equal to zero, the fingerprint capturing system may control all fingerprint sensors to be in a non-working state, that is, all of the multiple fingerprint sensors may be controlled not to perform fingerprint capturing, which is beneficial to avoiding fingerprint capturing caused by a user's accidental operation.

Figure 3:
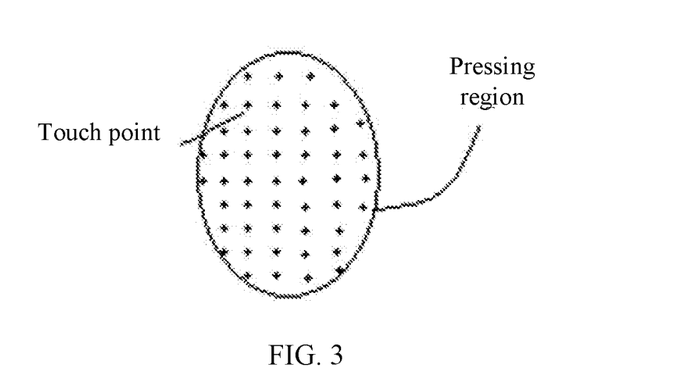
FIG. 3 is a schematic diagram of an example of determining a pressing region.

Specifically, when the user's finger is pressed against the display screen above the multiple fingerprint sensors, the fingerprint capturing system may obtain information about touch points at which the user presses the display screen, and further determine the pressing region of the user on the display screen according to coordinate information of the touch points, as shown in FIG. 3. Then, the fingerprint capturing system may determine the effectively pressed fingerprint sensor among the multiple fingerprint sensors according to the pressing region of the user, and may further control the effectively pressed fingerprint sensor among the multiple fingerprint sensors to be in a working state and another fingerprint sensor to be in a non-working state, that is, only the effectively pressed fingerprint sensor is turned on, so that the fingerprint information input by the user may be captured only by the effectively pressed fingerprint sensor. Further, a fingerprint identification unit only needs to perform an operation such as fingerprint authentication or fingerprint registration according to the fingerprint information of the user captured by the effectively pressed fingerprint sensor, which is beneficial to improving fingerprint identification efficiency.

That is, in the embodiment of the present application, the fingerprint identification unit only needs to perform fingerprint matching according to the fingerprint information captured by the effectively pressed fingerprint sensor instead of fingerprint information captured by all fingerprint sensors, which can reduce matching time, improve matching speed, and improve user experience.

Optionally, in the embodiment of the present application, the fingerprint capturing system may include the fingerprint identification unit, or may not include the fingerprint identification unit. If the fingerprint capturing system does not include the fingerprint identification unit, the fingerprint capturing system may only send the fingerprint information of the user captured by the effectively pressed fingerprint sensor to the fingerprint identification unit, so that the fingerprint identification unit can perform a subsequent fingerprint identification operation.

It should be noted that, in the embodiment of the present application, the function performed by the processing unit in the fingerprint capturing system may be performed by the same functional module, for example, a host module of an electronic device, or may be performed by multiple functional modules. For example, the processing unit of the fingerprint capturing system may include multiple functional modules, for example, a host module, a touch control (Touch Panel, TP) module and a fingerprint control module. The touch control module may be configured to detect the pressing region of the user on the display screen, and the fingerprint control module controls at least one effectively pressed sensor to be turned on. The host module may be configured to determine which sensors are effectively pressed according to the pressing region, which is not limited in the embodiment of the present application.

Optionally, in the embodiment of the present application, the touch control module may be integrated in the display screen, or may be a functional module independent of the display screen, for example, the touch control module may be integrated in a processor of an electronic device; and the fingerprint control module may be integrated in a fingerprint module, or may be a functional module independent of the fingerprint module, for example, the fingerprint control module may be integrated in a processor of an electronic device, which is not limited in the embodiment of the present application.

It should be understood that, in the embodiment of the present application, the non-working state of the fingerprint sensor may include a sleep state and a power-off state. When the fingerprint sensor is in the sleep state, a power supply is still turned on, but the fingerprint sensor is not woken up and fingerprint capturing cannot be performed. When the fingerprint sensor is in the power-off state, a power supply of the fingerprint sensor is turned off, and as a result, fingerprint capturing cannot be performed in the power-off state either.

Optionally, in some embodiments, the S210 specifically includes:

determining an overlapping region between the pressing region and a sensing region of each fingerprint sensor of the multiple fingerprint sensors; and determining the effectively pressed fingerprint sensor among the multiple fingerprint sensors according to an area of the overlapping region between the pressing region and the sensing region of the each fingerprint sensor.

Specifically, the fingerprint capturing system may determine the area of the overlapping region between the pressing region and the sensing region of each fingerprint sensor, that is, a size of an area pressed by the user on the sensing region of each fingerprint sensor; and further, the fingerprint capturing system may determine which fingerprint sensors are pressed or which fingerprint sensors are effectively pressed according to the area of the overlapping region.

Figure 4:
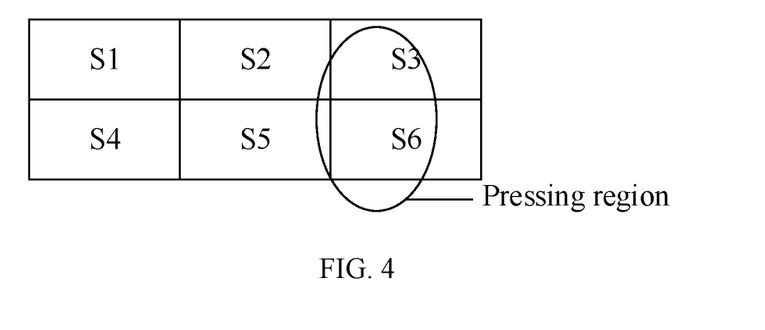
FIG. 4 is a schematic diagram of an example of determining an effectively pressed fingerprint sensor.

Optionally, the fingerprint capturing system may determine a fingerprint sensor corresponding to an overlapping region having an area larger than a first threshold (for example, 50% of the area of the sensing region of the fingerprint sensor) to be effectively pressed, or the fingerprint capturing system may also determine K fingerprint sensor(s) corresponding to K largest overlapping region(s) as the effectively pressed fingerprint sensor(s). For example, as shown in FIG. 4, the multiple fingerprint sensors may include six fingerprint sensors, denoted as S1 to S6, and the fingerprint sensors S3 and S6 may be determined to be effectively pressed according to areas of overlapping regions between the pressing region and sensing regions of the six fingerprint sensors.

Optionally, in some embodiments, the method 200 further includes:

determining a number threshold of the effectively pressed fingerprint sensor according to a security level of a first operation of triggering fingerprint capturing and a first correspondence relationship, where the first correspondence relationship is a correspondence relationship between a security level and a number threshold of the effectively pressed fingerprint sensor.

It should be understood that, in the embodiment of the present application, the first operation of triggering fingerprint capturing may be an screen off unlock operation of a terminal, or an operation of accessing an application, or a payment operation, or other operations that require fingerprint authentication, which is not limited in the embodiment of the present application.

In the embodiment of the present application, the fingerprint capturing system may set a security level corresponding to an operation. For example, the screen off unlock operation may be set as a low security level, the payment operation may be set as a high security level, and the application access of non-payment type may be set as a medium security level. The fingerprint capturing system may configure different number thresholds of an effectively pressed sensor for different security levels, that is, a first correspondence relationship is determined. Herein, a number threshold of an effectively pressed fingerprint sensor corresponding to each security level may be used to configure the maximum number of fingerprint sensors that can be turned on under the security level. By configuring different number thresholds for different security levels, it is beneficial to flexibly adjust the length of fingerprint information captured under different security levels, that is, a password length, so that both speed and security of fingerprint identification can be taken into account.

For example, the fingerprint capturing system may configure a lower number threshold for a low security level and a higher number threshold for a high security level. As such, for fingerprint capturing triggered by a operation at a low security level (for example, an screen off unlock operation), the fingerprint capturing system may control only a small number of fingerprint sensors to be used for fingerprint capturing, and fingerprint capturing by only a small number of fingerprint sensors is beneficial to reducing power consumption of a terminal. Meanwhile, only fingerprint information with a shorter length needs to be matched during fingerprint matching, which can increase speed of fingerprint identification. For fingerprint capturing triggered by an operation at a high security level (such as a payment operation), the fingerprint capturing system may control a large number of fingerprint sensors to be turned on for fingerprint capturing, which can increase a length of fingerprint information, and can further improve security of fingerprint identification.

That is, in the embodiment of the present application, different security levels may correspond to different number thresholds of an effectively pressed fingerprint sensor. The fingerprint capturing system may determine a number threshold of an effectively pressed fingerprint sensor according to a security level of the current operation. Further, the fingerprint capturing system may determine the effectively pressed fingerprint sensor according to the area of the overlapping region between the pressing region and each fingerprint sensor in combination with the number threshold.

Optionally, if the number threshold of the effectively pressed fingerprint sensor corresponding to the security level of the first operation of triggering fingerprint capturing is K in the first correspondence relationship, where K is a positive integer, in one embodiment, the fingerprint capturing system may first determine K largest overlapping region(s) among multiple overlapping regions, then determine an overlapping region having an area larger than a second threshold (for example, 30% of the area of the sensing region of the fingerprint sensor) among the K overlapping region(s). Assuming that there are L overlapping region(s), where L is a positive integer, the fingerprint capturing system may further determine L fingerprint sensor(s) corresponding to the L overlapping region(s) as the effectively pressed fingerprint sensor(s).

In another embodiment, the fingerprint capturing system may first determine an overlapping region having an area larger than a second threshold (for example, 30% of the area of the sensing region of the fingerprint sensor) among multiple overlapping regions. Assuming that there are P overlapping region(s), where P is a positive integer, if P is greater than K, the fingerprint capturing system may determine K largest overlapping region(s) among the P overlapping region(s), and the fingerprint capturing system may further determine K fingerprint sensor(s) corresponding to the K overlapping region(s) as effectively pressed fingerprint sensor(s); or if P is less than or equal to K, the fingerprint capturing system may directly determine P fingerprint sensor(s) corresponding to the P overlapping region(s) as the effectively pressed fingerprint sensor(s).

It should be understood that a security level corresponding to each operation may be set by the system or may be set by the user, for example, the user may set the security level by operating a setting interface of an electronic device or a setting interface of an application; similarly, the user may also set the number threshold of the effectively pressed sensor corresponding to each security level by operating a setting interface of an electronic device or a setting interface of an application.

In some optional implementation manners, the number threshold of the effectively pressed fingerprint sensor corresponding to the low security level may be determined according to the number of fingerprint sensors against which a single finger is able to be pressed, and the number threshold of the effectively pressed fingerprint sensor corresponding to the high security level may be determined according to the number of fingerprint sensors against which at least two fingers are able to be pressed.

In other words, for an operation at the low security level, a fingerprint of a single finger may be captured, so that fingerprint identification may be performed according to fingerprint information of the single finger, which is beneficial to improving speed of fingerprint identification and reducing power consumption of a terminal. For an operation at the high security level, fingerprints of at least two fingers may be captured, so that fingerprint identification may be performed according to fingerprint information of the at least two fingers, which is beneficial to improving security of fingerprint identification. Therefore, according to the specific application scenario, a fingerprint identification strategy is determined, which is beneficial to take into account of both power consumption of a terminal and security of fingerprint identification.

Figure 5:
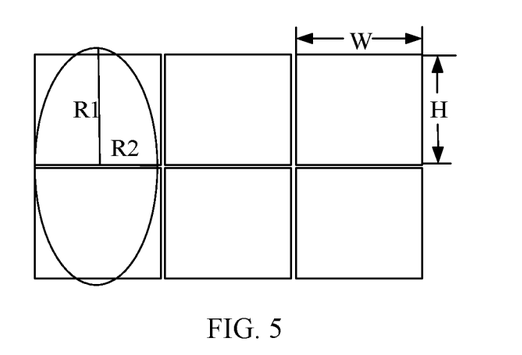
FIG. 5 is a schematic diagram of an example of determining a number threshold of an effectively pressed fingerprint sensor.

In a specific implementation, the number threshold of the effectively pressed fingerprint sensor corresponding to each security level may be determined as follows.

As shown in FIG. 5, assuming that a size of a sensing region of a single fingerprint sensor is W*H, a pressing region of a user on a display screen is usually circular or oval, and a long axis of the pressing region is R1 and a short axis is R2, where R1 and R2 can be obtained by trials on sizes of pressing regions of a large number of fingers on the display screen, the number of fingerprint sensors against which a single finger is able to be pressed is approximately P=[(R1*R2)/(W*H)], where [ ] represents rounding. Optionally, the fingerprint capturing system may determine the number threshold of the effectively pressed fingerprint sensor corresponding to the low security level as P, P+1, or P−1, and the number threshold of the effectively pressed fingerprint sensor corresponding to the high security level as 2P, 2P−1 or 3P, 3P−1, etc., that is, the number of fingerprint sensors that can be turned on is different for different security levels, and the higher the security level is, the more the fingerprint sensors can be turned on, which is beneficial to taking into account of both power consumption of a terminal and security of fingerprint identification.

Optionally, in some embodiments, the method further includes:

controlling a sensing region corresponding to the effectively pressed fingerprint sensor on the display screen to be illuminated.

Specifically, after determining which fingerprint sensors are effectively pressed, only sensing regions of the effectively pressed fingerprint sensors may be controlled to be illuminated, instead of illuminating sensing regions of all the fingerprint sensors, which is beneficial to reducing power consumption of a terminal. For example, for the example shown in FIG. 4, only the sensing regions of the fingerprint sensors S3 and S6 may be controlled to be illuminated.

Optionally, in some embodiments, the method 200 further includes:

performing fingerprint identification according to the fingerprint information of the user captured by the effectively pressed fingerprint sensor.

That is, the fingerprint identification unit only needs to perform fingerprint matching for the fingerprint information captured by the effectively pressed fingerprint sensor, instead of fingerprint information captured by all the fingerprint sensors, which can improve matching speed, and reduce a load of a terminal at the same time.

Figure 6:
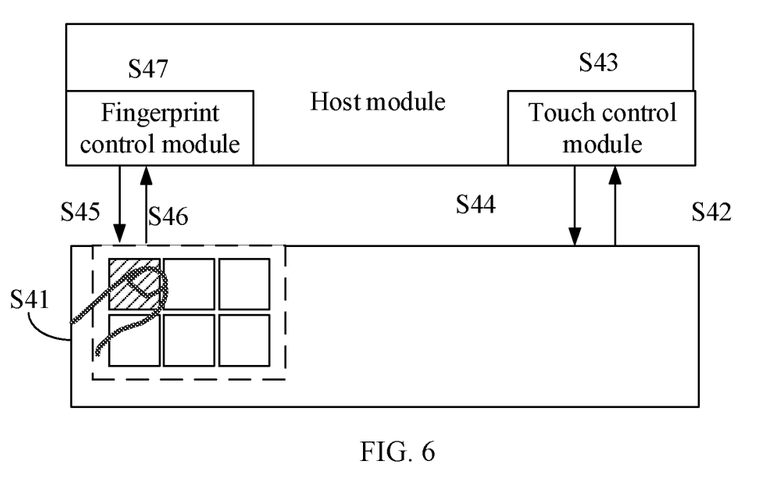
FIG. 6 is a flowchart of an under-screen fingerprint capturing method according to another embodiment of the present application.

A fingerprint capturing method according to a specific embodiment of the present application will be described below with reference to specific implementation shown in FIG. 6. As shown in FIG. 6, the fingerprint capturing method may include the following steps:

S41, pressing, by a user, a sensing region of a fingerprint sensor on a display screen;

S42, obtaining a pressing region of the user on the display screen;

S43, determining an effectively pressed fingerprint sensor among multiple fingerprint sensors according to the pressing region;

S44, controlling a sensing region of the effectively pressed fingerprint sensor to be illuminated;

S45, controlling the effectively pressed fingerprint sensor to be turned on, that is, controlling the effectively pressed fingerprint sensor to be in a working state and another fingerprint sensor to be in a non-working state;

S46, capturing, by the effectively pressed fingerprint sensor, fingerprint information of the user, and uploading the captured fingerprint information to a processor of an electronic device; and S47, performing, by the processor of the electronic device, an operation such as fingerprint identification or fingerprint registration according to the fingerprint information captured by the effectively pressed fingerprint sensor.

Optionally, in some embodiments, the S42, S43, S44, S45 and S47 may all be executed by a host module of the electronic device.

Optionally, the S42 and S44 may be executed by a touch control module of the display screen, the S45 may be executed by a fingerprint control module of a fingerprint apparatus, and the S43 and S47 may be executed by a host module of the electronic device, where the fingerprint control module may be integrated in the processor of the electronic device or in the fingerprint apparatus, and the touch control module may be integrated in the processor of the electronic device or in the display screen, which is not limited in the embodiment of the present application.

Method embodiments of the present application are described in detail with reference to FIGS. 2 to 6 above, and apparatus embodiments of the present application are described in detail with reference to FIG. 7 below. It should be understood that, the apparatus embodiments correspond to the method embodiments, and similar description may refer to the method embodiments.

Figure 7:
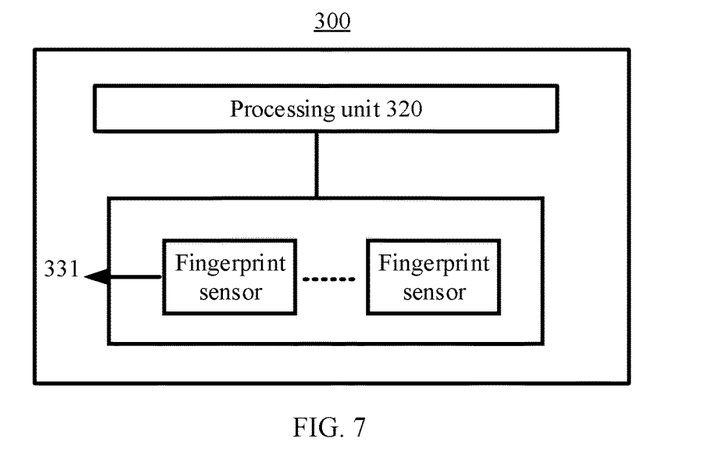
FIG. 7 is a schematic block diagram of a multi-sensor-based under-screen fingerprint capturing system according to an embodiment of the present application.

FIG. 7 is a schematic block diagram of a multi-sensor-based under-screen fingerprint capturing system according to an embodiment of the present application. As shown in FIG. 7, the system 300 includes:

multiple fingerprint sensors 331 configured to capture fingerprint information of a user; and a processing unit 320 configured to determine an effectively pressed fingerprint sensor among the multiple fingerprint sensors according to a pressing region of a user on a display screen, control the effectively pressed fingerprint sensor to be in a working state and another fingerprint sensor other than the effectively pressed fingerprint sensor to be in a non-working state, and capture, by the effectively pressed fingerprint sensor, the fingerprint information of the user, where each fingerprint sensor corresponds to a sensing region, and sensing regions corresponding to the multiple fingerprint sensors form a fingerprint capturing region of the under-screen fingerprint capturing system.

Optionally, in some embodiments, the processing unit 320 is further configured to:

determine an overlapping region between the pressing region and a sensing region of each fingerprint sensor of the multiple fingerprint sensors; and determine the effectively pressed fingerprint sensor among the multiple fingerprint sensors according to an area of the overlapping region between the pressing region and the sensing region of the each fingerprint sensor.

Optionally, in some embodiments, the processing unit 320 is configured to:

determine a fingerprint sensor corresponding to an overlapping region having an area larger than a first threshold as the effectively pressed fingerprint sensor.

Optionally, in some embodiments, the processing unit 320 is further configured to:

determine a number threshold of the effectively pressed fingerprint sensor according to a security level of a first operation of triggering fingerprint capturing and a first correspondence relationship, where the first correspondence relationship is a correspondence relationship between a security level and a number threshold of the effectively pressed fingerprint sensor.

Optionally, in some embodiments, the processing unit 320 is further configured to:

determine the effectively pressed fingerprint sensor among the multiple fingerprint sensors according to the area of the overlapping region between the pressing region and the sensing region of the each fingerprint sensor in combination with the number threshold of the effectively pressed fingerprint sensor.

Optionally, in some embodiments, the processing unit 320 is configured to:

determine K largest overlapping region(s) from the overlapping region between the pressing region and the sensing region of the each fingerprint sensor, where K is a number threshold of the effectively pressed fingerprint sensor corresponding to the security level of the first operation;

determine a target overlapping region having an area larger than a second threshold among the K overlapping region(s); and determine a fingerprint sensor corresponding to the target overlapping region as the effectively pressed fingerprint sensor.

Optionally, in some embodiments, in the first correspondence relationship, a first security level corresponds to N fingerprint sensors, a second security level corresponds to M fingerprint sensor(s), and the first security level is higher than the second security level, where N and M are positive integers, and N is greater than M.

Optionally, in some embodiments, M is a number of fingerprint sensors against which a single finger is able to be pressed, and N is a number of fingerprint sensors against which at least two fingers are able to be pressed.

Optionally, in some embodiments, the processing unit 320 is further configured to:

control a sensing region of the effectively pressed fingerprint sensor on the display screen to be illuminated.

Optionally, in some embodiments, the processing unit 320 is further configured to:

perform fingerprint identification according to the fingerprint information of the user captured by the effectively pressed fingerprint sensor.

Optionally, in some embodiments, the processing unit 320 may be disposed in a fingerprint module or an electronic device, where the fingerprint module includes the multiple fingerprint sensors.

Optionally, in some embodiments, the processing unit 320 is a micro control unit (MCU) in a fingerprint module or a processor in an electronic device.

Optionally, in some embodiments, the processing unit 320 includes:

a touch control module configured to determine the effectively pressed fingerprint sensor among the multiple fingerprint sensors according to the pressing region of the user on the display screen; and a fingerprint control module configured to control on and off of the multiple fingerprint sensors.

Optionally, in some embodiments, the processing unit 320 further includes:

a fingerprint identification module configured to perform fingerprint identification according to the fingerprint information of the user captured by the effectively pressed fingerprint sensor.

Optionally, in some embodiments, the touch control module is disposed in an electronic device, the fingerprint control module is disposed in an electronic device or a fingerprint module, and the fingerprint identification module is disposed in an electronic device or a fingerprint module.

It should be understood that, specifically, the under-screen fingerprint capturing system 300 may correspond to the fingerprint capturing system in the foregoing embodiments, and may be used to perform related operations of the foregoing method embodiments, which will not be repeated redundantly herein for the sake of brevity.

Figure 8:
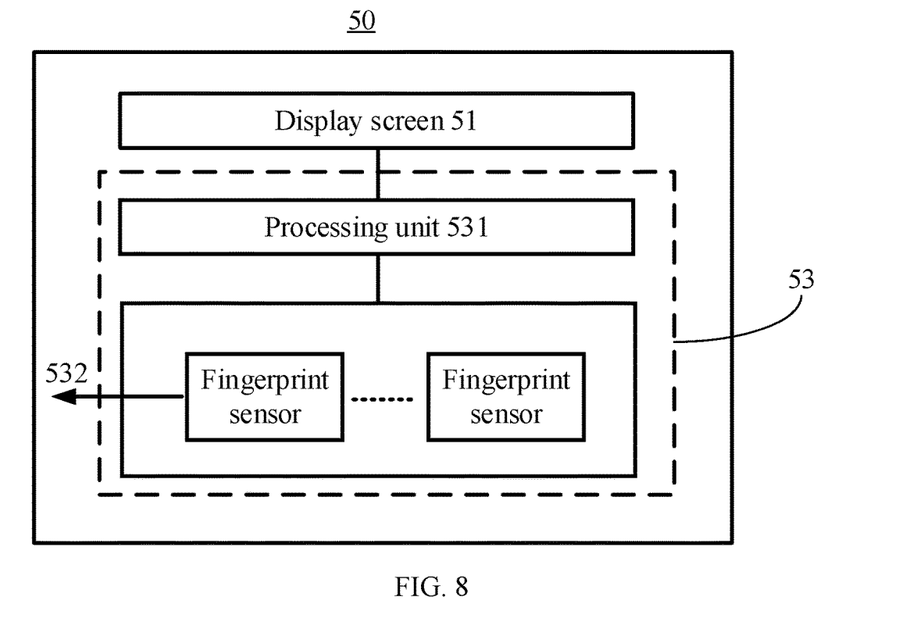
FIG. 8 is a schematic block diagram of an electronic device according to an embodiment of the present application.

FIG. 8 is a schematic block diagram of an electronic device according to an embodiment of the present application. As shown in FIG. 8, the electronic device 50 includes:

a display screen 51; and an under-screen fingerprint capturing system 53, including multiple fingerprint sensors 532 and a processing unit 531, where the under-screen fingerprint capturing system 53 may correspond to the under-screen fingerprint capturing system 300 in FIG. 7, and may be used to perform related operations of the foregoing method embodiments, which will not be repeated redundantly herein for the sake of brevity.

It should be understood that the number, size, and arrangement of the fingerprint sensors shown in the embodiment of the present application are only examples, and can be adjusted according to actual needs, which is not limited in the embodiment of the present application. For example, the number of the multiple fingerprint sensors may be two, three, four or five, etc. The multiple fingerprint sensors may be rectangularly distributed, circularly distributed, or the like.

It should be understood that the processor of the embodiment of the present application may be an integrated circuit chip with signal processing capability. In an implementation process, steps of the foregoing method embodiments may be completed by using an integrated logical circuit of hardware in the processor or an instruction in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and the logical block diagrams disclosed in the embodiments of the present application can be implemented or executed. The general purpose processor may be a microprocessor or the processor may be any conventional processor or the like. Steps of the methods disclosed in the embodiments of the present application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the steps of the foregoing method in combination with hardware of the processor.

It can be appreciated that, a terminal or an electronic device in an embodiment of the present application may further include a memory, and the memory may be either volatile memory or nonvolatile memory, or may include both volatile and nonvolatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM) and used as an external cache. By way of example and not limitation, RAMs of many forms are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the system and method described in this specification aims to include but is not limited to these memories and any memory of another proper type.

An embodiment of the present application further provides a computer readable storage medium, where the computer readable storage medium stores one or more programs, and the one or more programs include an instruction. When the instruction is executed by a portable electronic device that includes a plurality of application programs, the portable electronic device can execute the method in the embodiments shown in FIG. 2 to FIG. 6.

An embodiment of the present application further provides a computer program including instructions that, when executed by a computer, cause the computer to execute the method of the embodiments shown in FIG. 2 to FIG. 6.

An embodiment of the present application further provides a chip including an input and output interface, at least one processor, at least one memory and a bus, where the at least one memory is configured to store an instruction, the at least one processor is configured to call an instruction in the at least one memory to execute the method of the embodiments shown in FIG. 2 to FIG. 6.

It should be understood that, in various embodiments of the present application, values of sequence numbers of the above-mentioned various processes do not mean an order of execution which should be determined based upon functionalities and internal logics thereof, rather than setting any limitation to implementation of the embodiments of the present application.

Those of ordinary skill in the art may be aware that, units and algorithm steps of the examples described in the embodiments disclosed in this paper may be implemented by electronic hardware, or a combination of computer software and the electronic hardware. Whether these functions are executed in hardware or software mode depends on the specific applications and design constraint conditions of the technical solution. Those skilled in the art may implement the described functions by using different methods for each specific application, but this implementation should not be considered to be beyond the scope of the present application.

Those skilled in the art to which the present disclosure pertains may clearly understand that, for convenience and simplicity of description, the specific working processes of the system, the apparatus and the units described above may refer to corresponding processes in the foregoing method embodiments, and will not be repeated redundantly herein.

In the several embodiments provided in the present application, it should be understood that the disclosed system, apparatus, and method may be implemented in another manner. For example, the described apparatus embodiment is merely an example. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separate, and components displayed as units may or may not be physical units, may be located in one position, or may be distributed on multiple network units. Part of or all of the units here may be selected according to actual needs to achieve the objectives of the solutions of the embodiments of the present application.

In addition, functional units in the embodiments of the present application may be integrated into one processing unit, or each of the units may exist alone physically, or two or more units are integrated into one unit.

When implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present application, but the protection scope of the present application is not limited thereto, persons skilled in the art who are familiar with the art could readily think of variations or substitutions within the technical scope disclosed by the present application, and these variations or substitutions shall fall within the protection scope of the present application. Therefore, the protection scope of this application shall be subject to the protection scope of the claims.

What is claimed is:

1. An electronic device, comprising an under-screen fingerprint capturing system, wherein the under-screen fingerprint capturing system comprises:

multiple fingerprint sensors configured to capture fingerprint information of a user, wherein each fingerprint sensor corresponds to a sensing region, and sensing regions corresponding to the multiple fingerprint sensors form a fingerprint capturing region of the under-screen fingerprint capturing system; and a processing unit configured to determine an effectively pressed fingerprint sensor among the multiple fingerprint sensors according to a pressing region of a user on a display screen, control the effectively pressed fingerprint sensor to be in a working state and another fingerprint sensor other than the effectively pressed fingerprint sensor to be in a non-working state, and capture the fingerprint information of the user via the effectively pressed fingerprint sensor;

wherein the processing unit is further configured to:

determine a number threshold of the effectively pressed fingerprint sensor according to a security level of a first operation of triggering fingerprint capturing and a first correspondence relationship, wherein the first correspondence relationship is a correspondence relationship between a security level and a number threshold of the effectively pressed fingerprint sensor.

2. A multi-sensor-based under-screen fingerprint capturing method, applied to an under-screen fingerprint capturing system comprising multiple fingerprint sensors, wherein the method comprises:

determining an effectively pressed fingerprint sensor among the multiple fingerprint sensors according to a pressing region of a user on a display screen, wherein each fingerprint sensor corresponds to a sensing region, and sensing regions corresponding to the multiple fingerprint sensors form a fingerprint capturing region of the under-screen fingerprint capturing system;

controlling the effectively pressed fingerprint sensor to be in a working state and another fingerprint sensor other than the effectively pressed fingerprint sensor to be in a non-working state; and capturing fingerprint information of the user via the effectively pressed fingerprint sensor;

wherein the method further comprises:

determining a number threshold of the effectively pressed fingerprint sensor according to a security level of a first operation of triggering fingerprint capturing and a first correspondence relationship, wherein the first correspondence relationship is a correspondence relationship between a security level and a number threshold of the effectively pressed fingerprint sensor.

3. The method according to claim 2, wherein the determining the effectively pressed fingerprint sensor among the multiple fingerprint sensors according to the pressing region of the user on the display screen comprises:
determining an overlapping region between the pressing region and a sensing region of each fingerprint sensor of the multiple fingerprint sensors; and
determining the effectively pressed fingerprint sensor among the multiple fingerprint sensors according to an area of the overlapping region between the pressing region and the sensing region of the each fingerprint sensor.

4. The method according to claim 3, wherein the determining the effectively pressed fingerprint sensor among the multiple fingerprint sensors according to the area of the overlapping region between the pressing region and the sensing region of the each fingerprint sensor comprises:
determining a fingerprint sensor corresponding to an overlapping region having an area larger than a first threshold as the effectively pressed fingerprint sensor.

5. The method according to claim 2, wherein the determining the effectively pressed fingerprint sensor among the multiple fingerprint sensors according to the area of the overlapping region between the pressing region and the sensing region of the each fingerprint sensor comprises:
determining K largest overlapping region(s) from the overlapping region between the pressing region and the sensing region of the each fingerprint sensor, wherein K is a number threshold of the effectively pressed fingerprint sensor corresponding to the security level of the first operation;
determining a target overlapping region having an area larger than a second threshold among the K overlapping region(s); and
determining a fingerprint sensor corresponding to the target overlapping region as the effectively pressed fingerprint sensor.

6. The method according to claim 2, wherein in the first correspondence relationship, a first security level corresponds to N fingerprint sensors, a second security level corresponds to M fingerprint sensor(s), and the first security level is higher than the second security level, where N and M are positive integers, and N is greater than M.

7. The method according to claim 2, wherein the method further comprises:
controlling a region corresponding to the effectively pressed fingerprint sensor on the display screen to be illuminated.

8. The method according to claim 2, wherein the method further comprises:
performing fingerprint identification according to the fingerprint information of the user captured by the effectively pressed fingerprint sensor.

9. A multi-sensor-based under-screen fingerprint capturing system, comprising:
multiple fingerprint sensors configured to capture fingerprint information of a user, wherein each fingerprint sensor corresponds to a sensing region, and sensing regions corresponding to the multiple fingerprint sensors form a fingerprint capturing region of the under-screen fingerprint capturing system; and a processing unit configured to determine an effectively pressed fingerprint sensor among the multiple fingerprint sensors according to a pressing region of a user on a display screen, control the effectively pressed fingerprint sensor to be in a working state and another fingerprint sensor other than the effectively pressed fingerprint sensor to be in a non-working state, and capture the fingerprint information of the user via the effectively pressed fingerprint sensor;
wherein the processing unit is further configured to:
determine a number threshold of the effectively pressed fingerprint sensor according to a security level of a first operation of triggering fingerprint capturing and a first correspondence relationship, wherein the first correspondence relationship is a correspondence relationship between a security level and a number threshold of the effectively pressed fingerprint sensor.

10. The under-screen fingerprint capturing system according to claim 9, wherein the processing unit is further configured to:
determine an overlapping region between the pressing region and a sensing region of each fingerprint sensor of the multiple fingerprint sensors; and
determine the effectively pressed fingerprint sensor among the multiple fingerprint sensors according to an area of the overlapping region between the pressing region and the sensing region of the each fingerprint sensor.

11. The under-screen fingerprint capturing system according to claim 10, wherein the processing unit is configured to:
determine a fingerprint sensor corresponding to an overlapping region having an area larger than a first threshold as the effectively pressed fingerprint sensor.

12. The under-screen fingerprint capturing system according to claim 9, wherein the processing unit is further configured to:
determine K largest overlapping region(s) from the overlapping region between the pressing region and the sensing region of the each fingerprint sensor, wherein K is a number threshold of the effectively pressed fingerprint sensor corresponding to the security level of the first operation;
determine a target overlapping region having an area larger than a second threshold among the K overlapping region(s); and
determine a fingerprint sensor corresponding to the target overlapping region as the effectively pressed fingerprint sensor.

13. The under-screen fingerprint capturing system according to claim 9, wherein in the first correspondence relationship, a first security level corresponds to N fingerprint sensors, a second security level corresponds to M fingerprint sensor(s), and the first security level is higher than the second security level, where N and M are positive integers, and N is greater than M.

14. The under-screen fingerprint capturing system according to claim 9, wherein the processing unit is further configured to:
control a sensing region of the effectively pressed fingerprint sensor on the display screen to be illuminated; and
perform fingerprint identification according to the fingerprint information of the user captured by the effectively pressed fingerprint sensor.

15. The under-screen fingerprint capturing system according to claim 9, wherein the processing unit is a micro control unit (MCU) in a fingerprint module or a processor in an electronic device, wherein the fingerprint module comprises the multiple fingerprint sensors.

16. The under-screen fingerprint capturing system according to claim 9, wherein the processing unit comprises:
- a touch control module configured to determine the effectively pressed fingerprint sensor among the multiple fingerprint sensors according to the pressing region of the user on the display screen; and
- a fingerprint control module configured to control on and off of the multiple fingerprint sensors.

17. The under-screen fingerprint capturing system according to claim 16, wherein the processing unit further comprises:
- a fingerprint identification module configured to perform fingerprint identification according to the fingerprint information of the user captured by the effectively pressed fingerprint sensor.

18. The under-screen fingerprint capturing system according to claim 17, wherein the touch control module is disposed in an electronic device, the fingerprint control module is disposed in an electronic device or a fingerprint module, and the fingerprint identification module is disposed in an electronic device or a fingerprint module.

* * * * *